United States Patent [19]

Fukuda

[11] Patent Number: 4,571,644

[45] Date of Patent: Feb. 18, 1986

[54] TAPE RECORDER

[75] Inventor: Kazuo Fukuda, Kakuda, Japan

[73] Assignee: Alps Electric Co., Ltd., Japan

[21] Appl. No.: 431,394

[22] Filed: Sep. 30, 1982

[30] Foreign Application Priority Data

Feb. 22, 1982 [JP] Japan .................................. 57-22704

[51] Int. Cl.⁴ .............................................. G11B 15/00
[52] U.S. Cl. ....................................... 360/90; 360/93; 360/96.4
[58] Field of Search ................. 360/90, 93, 96.1, 96.3, 360/96.4, 69, 62, 12

[56] References Cited

U.S. PATENT DOCUMENTS

4,134,145 1/1979 Motoyama .................... 360/96.4 X
4,460,933 7/1984 Ban ................................ 360/96.4 X

*Primary Examiner*—John H. Wolff
*Attorney, Agent, or Firm*—Guy W. Shoup

[57] ABSTRACT

A tape recorder with improved cue and review operations is disclosed, wherein there is provided a cue/review engagement part which is engageable with a rotary shaft supporting an idler wheel and is capable of moving said rotary shaft so as to separate the idler wheel from a take-up reel when high speed rewind or fast/forward is desired and the engagement part is also engageable with a pinch roller actuator for disengaging the pinch roller from pressing the tape during cue or review operation.

6 Claims, 17 Drawing Figures

TAPE RECORDER

FIELD OF THE INVENTION

The present invention relates to a tape recorder (including a tape player), especially relating to a tape recorder whereby the operability of the cue and review operations can be improved.

BACKGROUND OF THE INVENTION

In conventional tape recorders, an idler for play motion and the like is devised to engage with a take-up reel block when a cue or review operation is conducted during play, which becomes a load when winding a tape and in some cases makes it impossible to wind of the tape.

OBJECT OF THE INVENTION

The present invention is made in view of such an actual state of conventional technology and the object thereof is to furnish a tape recorder wherein the tape can be run accurately during cue and review operations.

So as to accomplish this object, the present invention offers a constitution wherein a play lever moving a head base to the play position during play is provided with an engagement part which can be engaged with a rotary shaft supporting an idler linking the motion of a rotational driving power transforming mechanism capable of moving irrespective of the rotation of the reel block at the play position to the rotating motion of the take-up reel block and which moves the rotary shaft in the direction of separation from the take-up reel block.

DETAILED DESCRIPTION OF PREFERRED EMBODIMENTS

The following is a description of a tape recorder offered by the present invention based on FIGS. 1 to 17.

Figure 1:
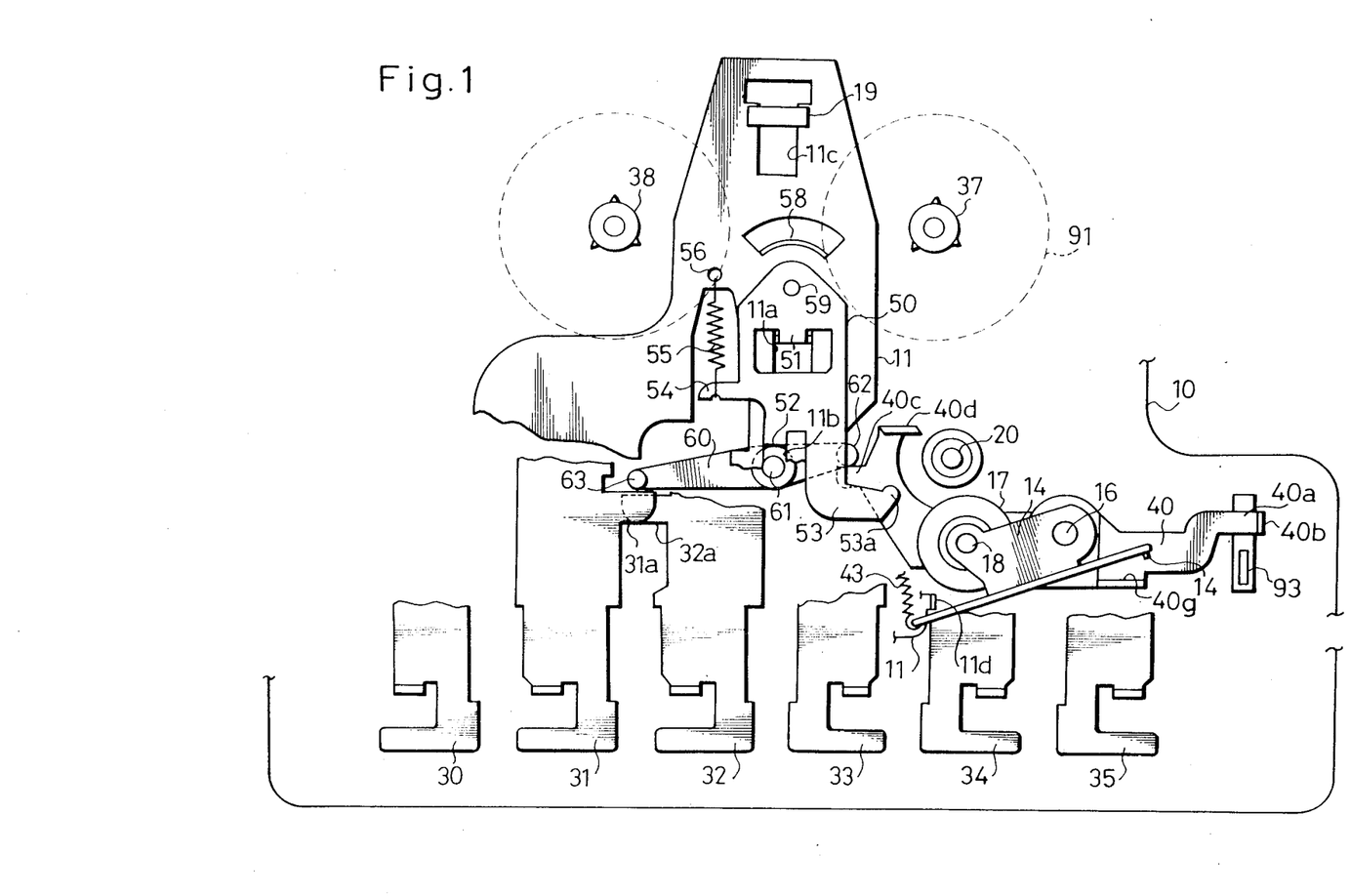
FIG. 1 to FIG. 4 are schematic plan views showing various states of operation of a tape recorder offered by the present invention.
Figure 5:
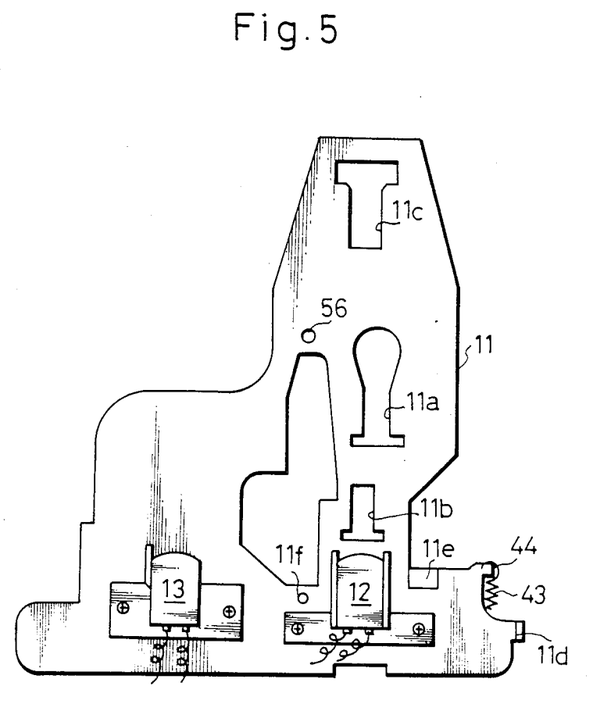
FIG. 5 is a plan view showing a head base.
Figure 6:
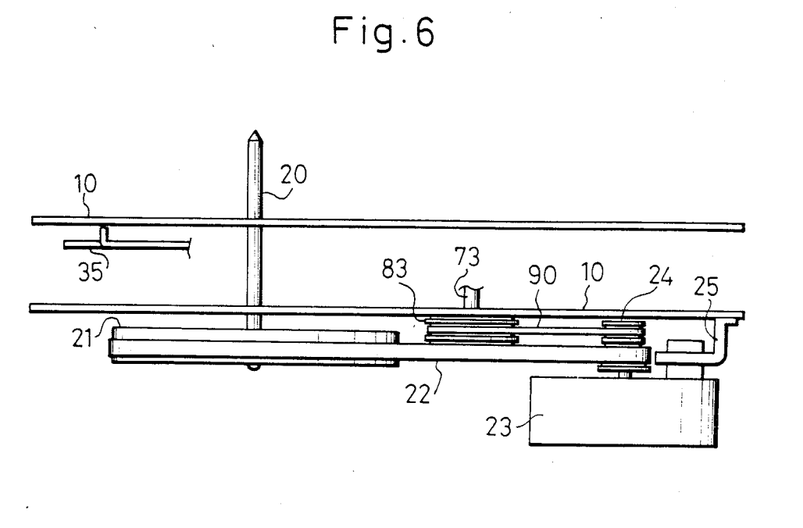
FIG. 6 is a schematic side view showing part of a power transmission mechanism.
Figure 14:
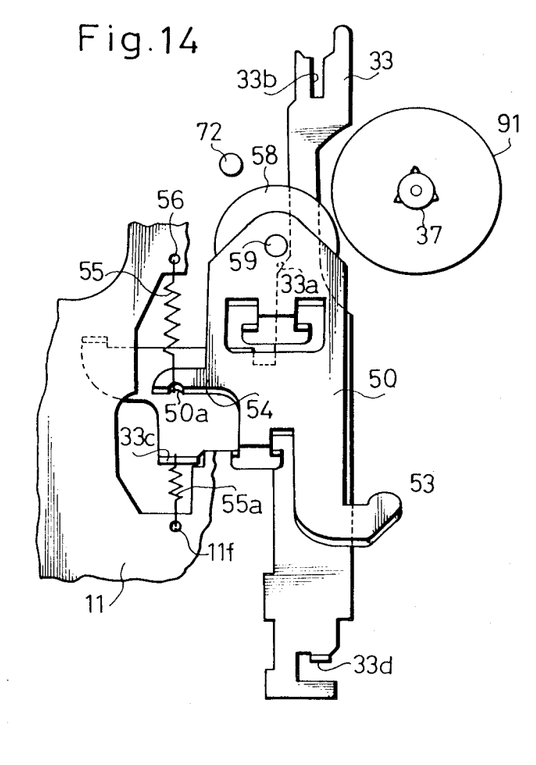
FIG. 14 is a plan view showing a positional relationship between the idler and the take-up reel block during stoppage.

In FIG. 1, numeral 10 is a chassis and numeral 11 is a head base which is fitted on the chassis 10 and movable between a play position and a non-play position. This head base 11 is provided with a recording head 12 and an erasing head 13 as shown in FIG. 5. A mechanism to retain the head base 11 at the play position is not shown in the figure, since it is well known. Numeral 14 is a pinch-roller retaining frame which is fitted to a shaft 16 and rotatable between the play position and non-play position. Numeral 17 is a pinch roller, which is fitted to the pinch-roller retaining frame through the intermediary of a fitting shaft 18. Numeral 19 is a guide for the head base 11, having a T-shaped cross-section and being fixed to the chassis 10. Numeral 20 is a capstan, which is provided with a fly-wheel 21 at the lower end thereof as shown in FIG. 6. This flywheel 21 is linked to the side of a driving shaft 24 of a motor 23 through the intermediary of a belt 22. The motor 23 is fixed to the chassis 10 by a bracket 25. In addition, on the chassis 10 is provided an operating slide board, that is, a recording lever 30, a rewind (review) lever 31, a fast-forward (cue) lever 32, a play lever 33, a stop lever 34 and a pause lever 35 in this order from the left as shown in FIG. 1. As a detailed description of the play lever 33 as a typical lever on the operating slide board, it has, as shown in FIG. 14, an engagement part with which a push button for operation, not shown in the figure, is engaged at one end 33d thereof, has a cut groove 33b for guiding at the other end thereof and has another engagement part 33a formed of a slanting projection engaging with the rotary shaft 59 of an idler 58 only during cue and review operations at an intermediate part thereof. It is connected to the head base 11 by a spring 55a firmly engaged with a projecting part 33c. Such a play lever 33 can be obtained by press forming steel plate.

Numerals 37 and 38 are a take-up reel block and a feeding reel block respectively, which are fitted rotatably on the chassis 10. Numeral 40 is an operating member for the pinch-roller retaining frame 14, which is fitted rotatably on the chassis 10 by the shaft 16 in the same way as the pinch-roller retaining frame 14. This operating member 40 is actuated clockwise, in FIG. 1, by a spring not shown in the figure.

Figure 7:
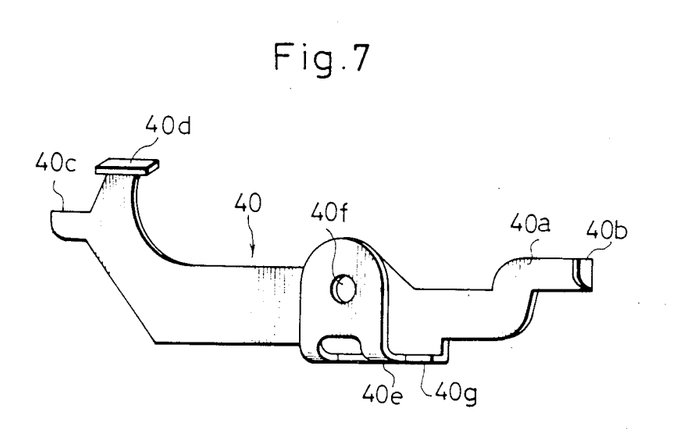
FIG. 7 is a perspective view showing an operating member for a frame for retaining a pinch roller.

As shown in FIG. 7, the operating member 40 has a shape substantially similar to the letter J and a projection 40a extending to the right at one end thereof. In this projection 40a a riser part 40b is formed. Moreover, it has another projection 40c extending to the left at the other end thereof and a riser part 40d is provided adjacent to the projection 40c. The intermediate part 40e thereof has a U-shaped longitudinal section, a hole 40f is formed on the two sides thereof and the shaft 16 is put through this hole 40f. In addition, the intermediate part 40e is provided with an engagement part 40g.

Figure 2:
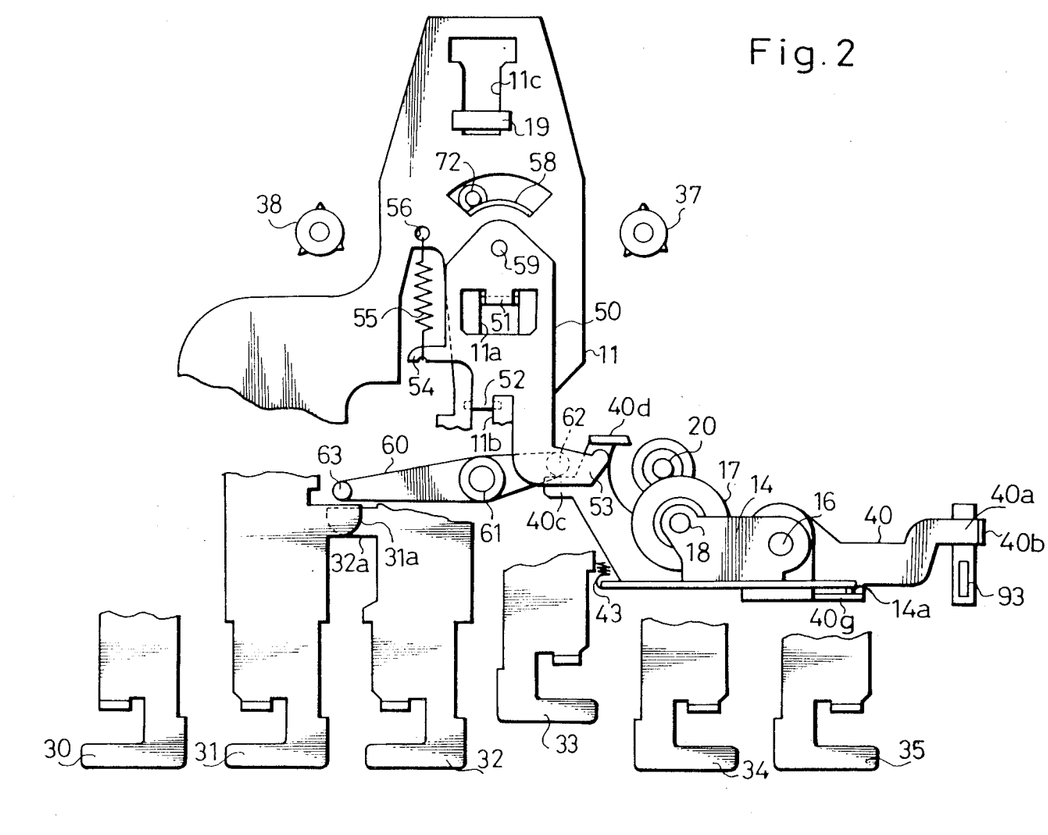
Figure 3:
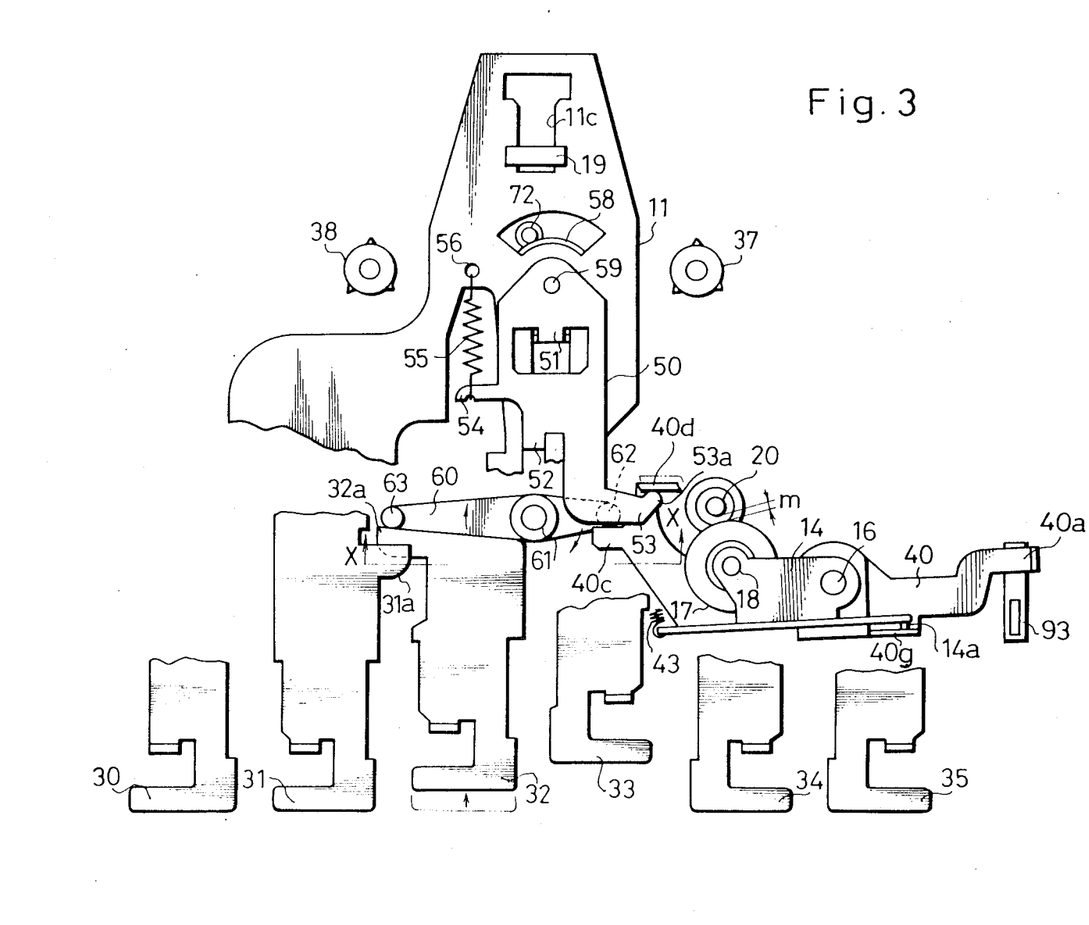
Figure 4:
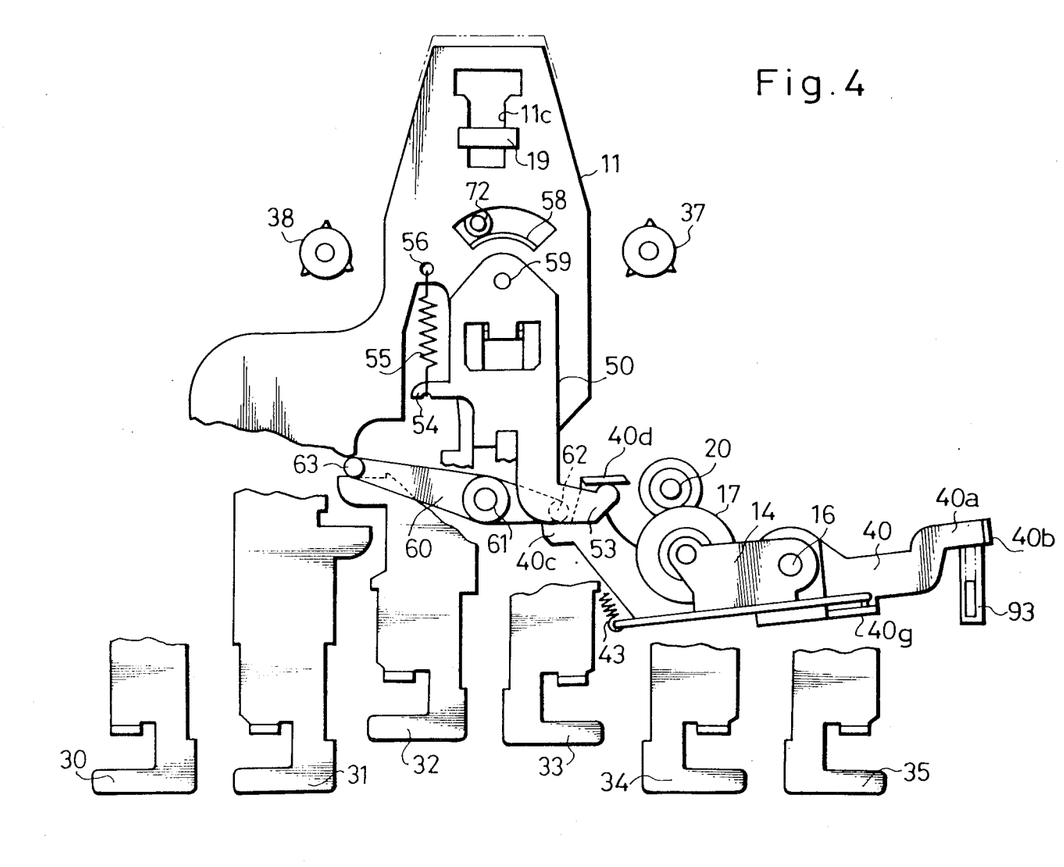
Figures 8, 9, 10:
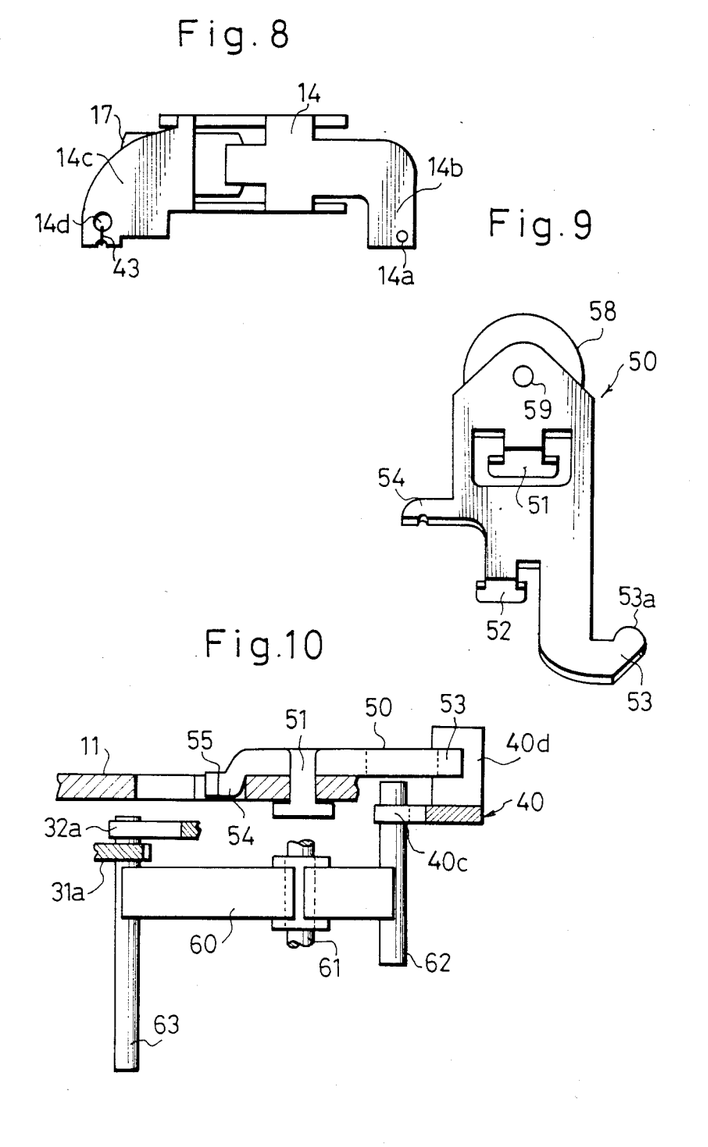
FIG. 8 is a front view showing a pinch roller and the frame for retaining the pinch roller.
FIG. 9 is a perspective view showing an idler and an operating piece.
FIG. 10 is a sectional view taken along X—X of FIG. 3.

The pinch-roller retaining frame 14 has a part 14b extending toward the operating member 40 at one end thereof as shown in FIG. 8, and in this part 14b a projection-shaped engagement part 14a is formed. This engagement part 14a of the pinch-roller retaining frame 14 is made engageable with the engagement part 40g of the operating member 40 as shown in FIGS. 2 to 4. In the other end 14c of this pinch-roller retaining frame 14 is formed an engagement hole 14d, with which one end of a spring 43 is engaged as shown in FIG. 1. The other end of the spring 43 is engaged with the engagement part 44 of the head base 11 as shown in FIG. 5.

In addition, in FIG. 1, numeral 50 is an operating piece provided slidably in the head base 11. At this operating piece 50 two riser-shaped guides 51 and 52 are formed. These guides 51 and 52 are fitted in the guide holes 11a and 11b of the head base 11 respectively, being devised to be guided in the vertical direction of FIG. 1. In another guide hole 11c of the head base 11 is put the guide 19 fixed to the chassis 10, being devised to guide the motion of the head base 11 in the vertical direction. Furthermore, as shown in FIG. 1 and FIG. 9, a projection having a shape similar to a letter J or L is formed in the lower part of the operating piece 50. The tip 53a of this projection 53 engages with the inside of the riser part 40d of the operating member 40 for the pinch-roller retaining frame 14. In addition, at the operating piece 50 is formed another projection 54, with which one end of a spring 55 is firmly engaged. The other end of this spring 55 is firmly engaged with the hole 56 of the head base 11. Accordingly, the operating piece 50 is constantly actuated toward the top of FIG. 1 by the spring 55. In the upper part of the operating piece 50, the idler 58 is supported rotatably by a rotary shaft 59, as shown also in FIG. 17.

Moreover, as shown in FIG. 1, a lever 60 is fitted rotatably on the chassis 10 by a shaft 61. On the two sides of this lever 60 pins 62 and 63 are fixed as shown in FIG. 10. Of these two pins, the pin 62 engages with the projection 40c of the operating member 40, while the other pin 63 engages with the projection 31a of the rewinding lever 31 and with the projection 32a of the fast-forward lever 32.

Figure 11:
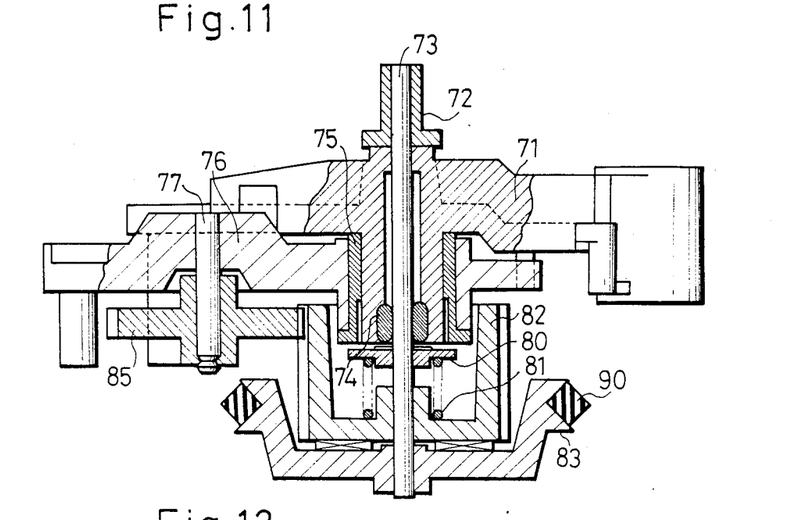
FIG. 11 is a longitudinal sectional view of a rotational driving power transforming mechanism.
Figure 12:
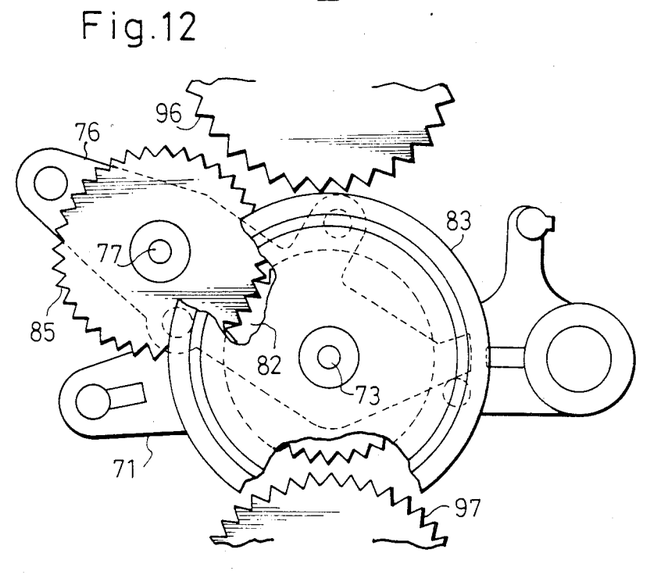
FIG. 12 is a base view of the rotational driving power transforming mechanism illustrated in FIG. 11.
Figure 13:
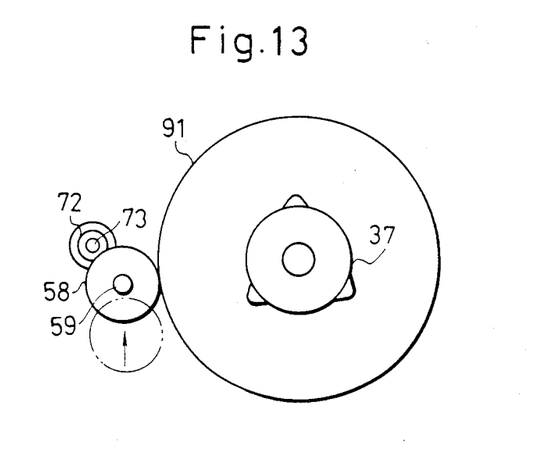
FIG. 13 is a schematic plan view showing the operational relationship between the bush of the rotational driving power transforming mechanism illustrated in FIG. 11 and a roller on the side of a take-up reel block.

FIGS. 11 to 13 illustrate a rotational driving power transforming mechanism. Numeral 71 is a rewind arm linked to the rewind lever 31, numeral 72 is a bush and numeral 73 is a shaft. This shaft 73 is borne rotatably on the rewind arm 71 by bearings 74. The bush 72 is fixed to the shaft 73. Numeral 76 is a fast-forward gear arm, which is supported rotatably by the rewind arm 71 through the intermediary of a spacer 75. This fast-forward gear arm 76 moves in linkage with the fast-forward lever 32. Numeral 77 is a shaft fixed to the fast-forward gear arm 76. A fast-forward gear 85 is supported rotatably by the shaft 77. Numerals 82 and 83 are a rewinding gear and a rewinding pulley fixed to the shaft 73, respectively. Numeral 80 is a receptacle for a spring and numeral 81 is a spring. The rewinding pulley 83 is connected to the side of the driving shaft 24 of the motor 23 shown in FIG. 6 through the intermediary of a belt 90.

OPERATION OF THE DEVICE

The following is a description of the operation of the tape recorder thus constituted.

FIGS. 1 and 14 show the device when stopped. At this time, the recording lever 30, the rewind lever 31, the fast-forward lever 32, the play lever 33, the stop lever 34 and the pause lever 35 are all positioned at the lowest position in FIG. 1. The pinch-roller retaining frame 14 is rotated counter-clockwise by the riser part 11d of the head base 11 against the pulling force of the spring 43, while the pinch roller 17 is separated from the capstan 20. Also at this time, the idler 58 is separated from the roller 91 of the take-up reel block 37 and from the bush 72.

Figure 15:
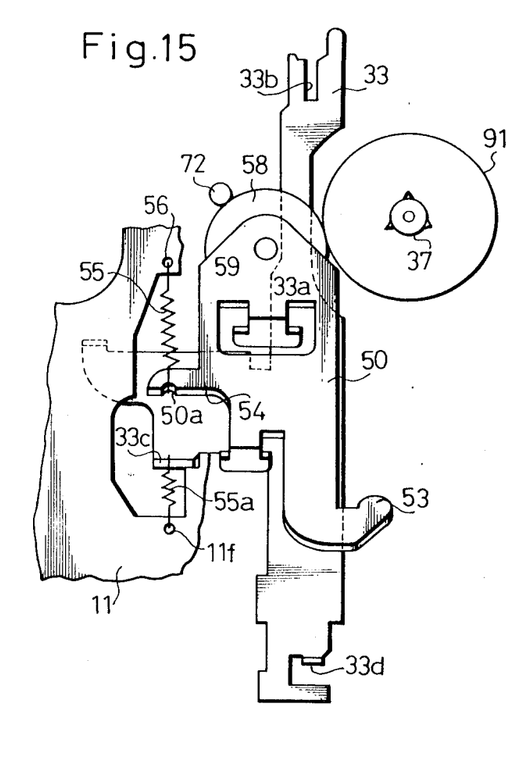
FIG. 15 is a plan view showing the positional relationship between the idler and the take-up reel block during play.

FIGS. 2 and 15 show the device when playing. When the play lever 33 advances, the head base 11 advances through the intermediary of the spring 55a and the operating piece 50 advances through the intermediary of the spring 55. Then, as shown in FIG. 15, the idler 58 contacts with the bush 72 and the roller 91 of the take-up reel block 37 so that the rotational power of the bush is transmitted to the roller. In addition, the pinch-roller retaining frame 14 is pulled by the spring 43 to rotate clockwise and thereby the pinch roller 17 approaches the capstan 20. By this motion, the tape (not shown in the figure) is held with prescribed pressure between the pinch roller 17 and the capstan 20.

When the fast-forward lever 32 is advanced when in this playing state, a state shown in FIG. 3 comes about. That is, when the fast-forward lever 32 advances a little from the position indicated by the alternate long and short dashed line, the projection 32a of the lever 32 pushes up the pin 63 to rotate the lever 60 clockwise, thereby the pin 62 is pushed down to move the projection 40c at one end part of the operating member 40 engaging with the pin 62 and thus the operating member 40 is rotated counterclockwise. When the riser part 40d of the operating member 40 contacts with the tip 53a of the projection 53 of the operating piece 50, a small gap m is made between the pinch roller 17 and the capstan 20, whereby the forward winding of the tape (not shown) by the pinch roller 17 is stopped.

Figure 16:
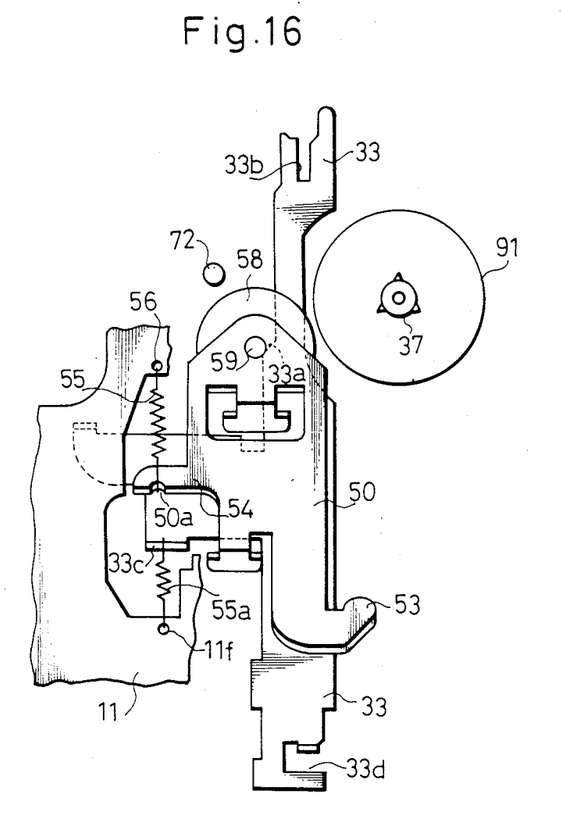
FIG. 16 is a plan view showing the positional relationship between the idler and the take-up reel block during cue and review.
Figure 17:
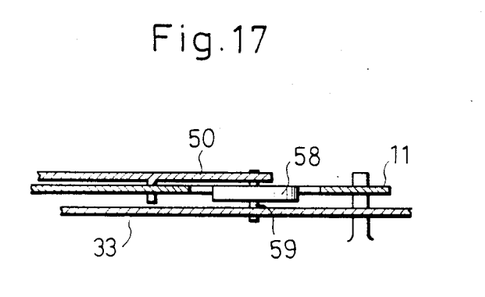
FIG. 17 is a sectional side view showing the positional relationship between the idler and the play lever.

When the fast-forward lever 32 is further advanced afterwards, the states shown in FIGS. 4 and 16 arise. That is, the lever 60 rotates further clockwise, the operating member 40 rotates therewith counterclockwise, the projection 53 is drawn downward by the rotation of the riser part 40d of this operating member 40, the operating piece 50 is thereby moved back from the forward position, and the idler 58 is separated therewith slightly from the bush 72. In this way, the transmission of rotational power from the bush 72 to the roller 91 of the take-up reel block 37 is stopped. When the lever 60 rotates further clockwise, the pin 62 contacts with the engagement part 11e of the head base 11 shown in FIG. 5 and thereby the head base 11 is moved back from the play position. Simultaneously, as shown in FIG. 16, the idler 58 is separated from the take-up reel block 37, since the rotary shaft 59 engages with the engagement part 33a of the play lever 33. By these motions, the cue and review positions are prepared. Thereafter, the fast-forward lever 32 is set firmly at the forward position thereof by a well known engagement mechanism (not shown in the figure).

On the other hand, when the fast-forward lever 32 is advanced, the fast-forward gear arm 76 shown in FIGS. 11 and 12 is rotated clockwise in FIG. 12, whereby the fast-forward gear 85 is engaged with the gear 96 on the side of the takeup reel block 37. As the result, the rotational power is transmitted from the motor 23 to the belt 90, the pulley 83, the shaft 73, the rewinding gear 82, the fast-forward gear 85, the gear 96 and the take-up reel block 37 sequentially, and thereby the take-up reel block 37 is rotated at high speed to run the tape at high speed.

When the desired music is selected by the cue operation, a solenoid mechanism (not shown in the figure) operates, disengaging the engagement of the fast-forward lever 32 and bringing about the state playing again.

When the pause lever 35 is advanced during play, a driving piece 93 moves from the position indicated by the solid line to that indicated by the alternate long and short dashed line in FIG. 4, in linkage with the pause lever 35, and thereby the operating member 40 is rotated counterclockwise. On this occasion, after the operating member 40 rotates slightly, the riser part 40d contacts with the tip 53a of the projection 53 of the operating piece 50. At this time, a small gap m is made between the pinch roller 17 and the capstan 20. When the operating member 40 is further rotated, the operating piece 50 moves back and the idler 58 leaves therewith from the bush 72. By this motion, the transmission of the rotating power to the roller 91 of the take-up reel block 37 is discontinued.

When the pause lever 35 is released and returned to its home position (the position indicated by a solid line), the playing state of FIG. 2 is restored.

In addition, when the rewinding lever 31 is advanced, the lever 60 is rotated in the same way as the operation of the fast-forward lever 32 and thereby the pinch roller 17 is separated from the capstan 20, while the idler 58 separates from the bush 72. The rewinding arm 71 shown in FIGS. 11 and 12 rotates counterclockwise and the rewinding gear 82 engages with the gear 97 on the side of the feeding reel block 38. As the result, the rotational power from the motor 23 is transmitted to the feeding reel block 38, whereby the block 38 is rotated at high speed.

As stated above, the tape recorder offered by the present invention has a constitution wherein the chassis, the feeding reel block and take-up reel block which are provided rotatably on the chassis, the capstan provided rotatably on the chassis, the flywheel rotating together with this capstan, the motor rotating this flywheel and the head base provided movably between the play position and the non-play position in relation to the chassis are provided, wherein the idler linking the motion of the rotational driving power transforming mechanism capable of moving irrespective of the rotation of the reel block at the play position to the rotational motion of the take-up reel block and the operating member having a rotary shaft supporting this idler rotatably are fitted to the head base in such a manner that they can slide in the forward-backward direction and rotate slightly, wherein the play lever moving the head base to the play position during play is provided with an engagement part which is engageable with the rotary shaft and moves the rotary shaft in the direction of separation from the take-up reel block and wherein the aforesaid engagement part is engaged with the rotary shaft and the idler is separated from the take-up reel block during cue and review. Accordingly, the present invention brings forth the effect that the rotational load of the take-up reel during the cue and review operations is reduced and that the cue and review motions can be performed smoothly and accurately.

What is claimed is:

1. A tape recorder having a first lever for actuating a normal play mode and a second lever for actuating fast forward/cue modes, the tape recorder comprising:

a chasis;
 a take up reel block rotatably mounted on said chasis;
 a head base slideably mounted on said chasis;
 an idler wheel shaft slideably coupled to the chasis;
 an idler wheel rotatably mounted on the idler wheel shaft;
 a rotational power source means mounted on said chasis; and
 engagement means for actuating the fast-forward/cue modes;
 where the rotational power source means normally engages the idler wheel and the idler wheel normally engages the take up reel block when the first lever is fully actuated; and
 wherein the engagement means for actuating the fast forward/cue modes is engageable with the idler wheel shaft and capable of separating the idler wheel from the rotational power source means when said second lever is partly actuated, thereby breaking a path of power transmission from the rotational power source means to the take up reel block by way of the idler wheel.

2. A tape recorder according to claim 1 further comprising:
 a capstan shaft rotatable on said chasis;
 a pinch roller actuator pivotably mounted to said read base; and
 a pinch roller, rotatably mounted on the pinch roller actuator and engageable with said capstan shaft, said pinch roller being normally biased against said capton when the normal play mode is actuated;
 wherein said engagement means is engageable with the pinch roller actuator and capable of separating the pinch roller from the capstan during cue/-review operations.

3. A tape recorder according to claim 1 wherein said rotational power source means comprises;
 a power shaft rotatably coupled to the chasis;
 a bush for engaging with the idler wheel fixed to one end of said power shaft.

4. A tape recorder according to claim 3 further comprising a rewind arm pivotably mounted to the chasis where said power shaft is rotatably mounted through said rewind arm.

5. A tape recorder according to claim 1 having a second path for transmitting rotational power from the rotational power source means to the take up reel block, where said idler wheel constitutes a first power transmission path.

6. A tape player according to claim 5 wherein said rotational power source means comprises a power shaft, and wherein second path comprises gear means mounted on said power shaft.

* * * * *